(12) United States Patent
Sharp et al.

(10) Patent No.: US 8,748,532 B2
(45) Date of Patent: Jun. 10, 2014

(54) FLEXIBLE, LOW TEMPERATURE, FILLED COMPOSITE MATERIAL COMPOSITIONS, COATINGS, AND METHODS

(75) Inventors: Richard E. Sharp, Weldon Spring, MO (US); Andrew P. Nowak, Los Angeles, CA (US); Chaoyin Zhou, Chino, CA (US)

(73) Assignee: The Boeing Company, Chicago, IL (US)

( * ) Notice: Subject to any disclaimer, the term of this patent is extended or adjusted under 35 U.S.C. 154(b) by 97 days.

(21) Appl. No.: 13/492,861

(22) Filed: Jun. 9, 2012

(65) Prior Publication Data

US 2013/0331509 A1   Dec. 12, 2013

(51) Int. Cl.
*C08L 83/04* (2006.01)
*C09D 183/04* (2006.01)

(52) U.S. Cl.
USPC .......................................... 524/588; 524/589

(58) Field of Classification Search
None
See application file for complete search history.

(56) References Cited

U.S. PATENT DOCUMENTS

| | | | | |
|---|---|---|---|---|
| 4,202,807 A | * | 5/1980 | Moretto et al. | 524/263 |
| 4,269,945 A | * | 5/1981 | Vanderhider et al. | 521/159 |
| 5,614,575 A | * | 3/1997 | Kotschwar | 524/270 |
| 5,670,598 A | * | 9/1997 | Leir et al. | 528/28 |
| 5,760,155 A | * | 6/1998 | Mowrer et al. | 528/28 |
| 6,313,254 B1 | * | 11/2001 | Meijs et al. | 528/26 |
| 6,451,438 B1 | * | 9/2002 | Chiang et al. | 428/447 |
| 7,262,260 B2 | * | 8/2007 | Yilgor et al. | 528/38 |
| 2002/0028901 A1 | * | 3/2002 | Gunatillake et al. | 528/28 |
| 2006/0276613 A1 | * | 12/2006 | Yilgor et al. | 528/76 |
| 2008/0027201 A1 | * | 1/2008 | Yilgor et al. | 528/28 |
| 2009/0182111 A1 | * | 7/2009 | Padsalgikar | 528/28 |
| 2011/0086940 A1 | * | 4/2011 | Rega | 523/122 |

FOREIGN PATENT DOCUMENTS

EP    1460095 A1    9/2004

OTHER PUBLICATIONS

Nunes, et al. "Polymer-filler interactions and mechanical properties of a polyurethane elastomer" Polymer Testing, 19, 2000, 93-103.*
Charles A. Harper, "Handbook of Plastics Technologies", 2006, Publisher The McGraw-Hill Companies, Inc., Table of Contents and Portions of Chapter 4 Elastomers, 13 pages.
European Patent Office Extended European Search Report for Counterpart EP Application No. 13170874.5, Applicant The Boeing Company, Dated Aug. 30, 2013, 6 pages.
Allan F.M. Barton, Ph.D., "CRC Handbook of Solubility Parameters and Other Cohesion Parameters", 1983, CRC Press, Inc., Boca Raton, Florida, 13 pages.
Clarson, et al., "Studies of Cyclic and Linear Poly(dimethylsiloxanes):19. Glass Transition Temperatures and Crystallization Behaviour", Polymer, Jun. 1985, vol. 26, pp. 930-934.

(Continued)

Primary Examiner — Robert S Loewe

(57) ABSTRACT

There is provided a flexible, low temperature, filled composite material composition and method of synthesizing the composite material composition. The composite material composition has a segmented copolymer elastomer having an $\alpha,\omega$-(alpha, omega)-dihydroxy terminated polysiloxane species, a diisocyanate species, and an amine or hydroxy terminated chain extender. The composite material composition further has a solid particulate filler. The composite material composition has a high flexibility at a temperature of down to about −100 degrees Celsius, has a percent elongation of greater than about 100%, and has a tensile strength of greater than about 5 MPa (megapascals).

22 Claims, 9 Drawing Sheets

(56) References Cited

OTHER PUBLICATIONS

Dollase, et al., "Crystallization of PDMS: The Effect of Physical and Chemical Crosslinks", Europhysics Letters, Nov. 2002, 60(3), pp. 390-396.
Ho, et al., "Polydimethylsiloxane-Urea-Urethane Copolymers with 1,4-Benzenedimethanol as Chain Extender", Macromolecules, 1993, vol. 26, No. 25, pp. 7029-7036.
Kricheldorf, et al., "Handbook of Polymer Synthesis", Second Edition, 2005, Marcel Dekker, Monticello, New York, 42 pages.
Petrovic, et al., "Polyurethane Elastomers", Progress in Polymer Science, 1991, vol. 16, pp. 695-836.
Eugene G. Rochow, "Silicon and Silicones", 1987, Springer-Verlag, Berlin, Germany, 24 pages.
Sheth, et al., "Structure-Property Behavior of Poly(dimethylsiloxane) Based Segmented Polyurea Copolymers Modified with Poly(propylene oxide)", Polymer, 2005, vol. 46, pp. 8185-8193.
Sheth, et al., "Influence of System Variables on the Morphological and Dynamic Mechanical Behavior of Polydimethylsiloxane Based Segmented Polyurethane and Polyurea Copolymers: A Comparative Perspective", Polymer, 2004, vol. 45, pp. 6919-6932.
Tyagi, et al., "Segmented Organosiloxane Copolymers: 2 Thermal and Mechanical Properties of Siloxane-Urea Copolymers", Polymer, Dec. 1984, vol. 25, pp. 1807-1816.
Yang, et al., "Synthesis and Characterization of Polydimethylsiloxane Polyurea-Urethanes and Related Zwitterionomers", Journal of Polymer Science: Part B: Polymer Physics, 1991, vol. 29, pp. 75-86.
Technical Bulletin for JEFFAMINE D-400 Polyetheramine, Huntsman Corporation, available at <http://www.huntsman.com>, last visited Jun. 9, 2012, 2 pages.
Technical Bulletin for JEFFAMINE ED-600 Polyetheramine, Huntsman Corporation, available at <http://www.huntsman.com>, last visited Jun. 9, 2012, 2 pages.

* cited by examiner

Compositional Ranges for Polymers

| Component | Broadest Range | Practical Range | Preferred Target |
|---|---|---|---|
| Poly(dimethylsiloxane) (PDMS) | 30-80% | 40-65% | 52% |
| Diisocyanate (HMDI) | 5-40% | 10-20% | 16% |
| Chain extender (curative) | 10-50% | 20-40% | 31% |

FIG. 2

Mechanical Behavior of Unfilled Composite Material Compositions

| Sample | Unfilled | |
|---|---|---|
| | % Elongation | Tensile Strength (MPa) |
| Polyurethane | 566 ± 86 | 58 ± 11.9 |
| Sample 1 PDMS 5k / HMDI / DAC | 473 ± 91 | 48 ± 14.2 |
| Sample 2 PDMS 5k / HMDI / D400 | -- | -- |
| Sample 3 PDMS 5k / HMDI / ED600 | 2700 ± 360 | 7.0 ± 1.9 |

FIG. 3

Mechanical Behavior of Filled Composite Material Compositions

| Sample | Filled 40 vol% Filler | |
|---|---|---|
| | % Elongation | Tensile Strength (MPa) |
| Polyurethane | 214 ± 5.5 | 31.2 ± 1.4 |
| Sample 1<br>PDMS 5k / HMDI / DAC | 5.7 ± 0.8 | 3.3 ± 0.3 |
| Sample 2<br>PDMS 5k / HMDI / D400 | 87.2 ± 1.3 | 3.0 ± 0.4 |
| Sample 3<br>PDMS 5k / HMDI / ED600<br>+ 2% Cabosil | 237 ± 8.6 | 11.2 ± 0.3 |

FIG. 4

| Sample | Soak Temperature | Soak Duration | Final Modulus |
|---|---|---|---|
| Filled Sample 3 | -60°C | 5 hr | 601 MPa |
| Filled Sample 3 | -80°C | 3.5 hr | 1430 MPa |
| Filled Polyurethane | -60°C | 5 hr | 9300 MPa |
| Filled Polyurethane | -80°C | 3.5 hr | 11100 MPa |

FIG. 8

Percent (%) Volume Change of Filled Composite Material Compositions Following Fluid Exposure

| Fluid | Filled Polyurethane | Filled Sample 2 | Filled Sample 3 |
|---|---|---|---|
| Jet Fuel 7 day Ambient | 10.7% | 125% | 54.6% |
| Hydraulic Fluid 7 day Ambient | 6.5% | 8.4% | 9.6% |
| Lubricating Oil 24 hr 120°C | 15.9% | 63% | 12.7% |
| Water 7 day 49°C | 4.2% | 3.5% | 5.7% |

FLEXIBLE, LOW TEMPERATURE, FILLED COMPOSITE MATERIAL COMPOSITIONS, COATINGS, AND METHODS

CROSS REFERENCE TO RELATED APPLICATIONS

This nonprovisional patent application is related to prior filed U.S. nonprovisional patent application Ser. No. 12/277, 264, titled "LOW TEMPERATURE SEGMENTED COPOLYMER COMPOSITIONS AND METHODS", filed on May 11, 2010, the content of which is hereby incorporated by reference in its entirety.

BACKGROUND

1) Field of the Disclosure

The disclosure relates to composite material compositions, coatings, and methods using segmented copolymers, and in particular, to composite material compositions, coatings, and methods using segmented copolymer elastomers and solid particulate fillers.

2) Description of Related Art

Elastomeric materials are required in a broad variety of applications, including use in low temperature, subfreezing environments, such as less than −50° C. Elastomeric materials that possess the ability to demonstrate a high degree of toughness through both high elongation and tensile strength find application in a variety of environments, such as the aerospace environment, where such low temperatures are common.

However, many known elastomers may not maintain their advantageous elastic properties at such low temperatures because such known elastomers may comprise polymer species that cause the elastomers to stiffen and become brittle. In addition, known elastomeric polymers, such as polysiloxanes, that are able to individually maintain flexibility at low temperatures may have reduced mechanical strength at low temperatures. Known elastomeric systems may exhibit dramatic stiffening at low temperatures due to onset of the glass transition temperature ($T_g$) from polymeric chains in the material. Below $T_g$, the elastomer may experience an abrupt increase in modulus of 10-100 times upon cooling, rendering the material hard and brittle. Many resins composed of silicones or polyurethanes which are commonly used on aircraft exterior surfaces may undergo this transition at −30° C. to −40° C. However, since the temperature at high altitudes is often well below this range, it is desirable to find an alternative that will maintain flexibility at lower temperatures.

Addition of particulate fillers in the range of 10-100 nm (nanometers) may have a beneficial effect on the mechanical properties of elastomers, and they are typically referred to as "reinforcing fillers". However larger particles, such as in the 1-100 μm (micrometer) range, may have a detrimental effect on elastomer mechanical properties, yet these particles are often desirable in order to add additional functionality to the overall composite material. Moreover, while some elastomeric materials may possess lower $T_g$s, they may be incapable of being processed in solution mixed with high levels of solid fillers and easily applied over vehicle scale areas.

In addition, known systems and methods exist regarding the use of polyether compounds to improve the mechanical properties of segmented polyurea silioxanes. However, these materials use the polyether compounds as a second soft segment block to reside between the silicone and urea hard segments rather than as a chain extender or curative, thus producing a different chain backbone structure. Such an intermediate polyether segment introduces a structural element into the polymer system with a higher glass transition temperature (Tg) of approximately −50° C. that may reduce the low temperature range over which the material is elastic. Moreover, the addition of fillers to these materials is desirable.

Further, it is desirable for elastomeric materials to be able to be formulated into a form that may be conveniently prepared and applied in the field. This may require precursor components that are capable of being stored and stable over acceptable time periods. Once combined, the elastomeric precursors may demonstrate an acceptable pot life or be suspended in a medium that allows for convenient application. Low general toxicity of individual components, chemical resistance to fluids commonly found in aerospace environments, and the ability to be compounded with filler materials are also desirable.

Accordingly, there is a need for filled composite materials that can maintain classic elastic properties and continue to demonstrate high degrees of toughness in low temperature, demanding environments, as well as a need for flexible, low temperature, filled composite material compositions, coatings, and methods that provide advantages over known compositions, coatings, and methods.

SUMMARY

This need for filled composite materials that can maintain classic elastic properties and continue to demonstrate high degrees of toughness in low temperature, demanding environments, as well as the need for flexible, low temperature, filled composite material compositions, coatings, and methods are satisfied. Embodiments of the flexible, low temperature, filled composite material compositions, coatings, and methods provide numerous advantages discussed in further detail in the below detailed description.

In an embodiment of the disclosure, there is provided a flexible, low temperature, filled composite material composition. The composite material composition comprises a segmented copolymer elastomer comprising an α,ω-(alpha, omega)-dihydroxy terminated polysiloxane species, a diisocyanate species, and an amine or hydroxy terminated chain extender. The composite material composition further comprises a solid particulate filler. The composite material composition has a high flexibility at a temperature of down to about −100 degrees Celsius, has a percent elongation of greater than about 100%, and has a tensile strength of greater than about 5 MPa (megapascals).

In another embodiment of the disclosure, there is provided a flexible, low temperature, filled composite coating. The coating comprises a composite material composition comprising a segmented copolymer elastomer and a solid particulate filler. The segmented copolymer elastomer comprises an α,ω-(alpha, omega)-dihydroxy terminated polysiloxane species, a diisocyanate species, and an amine or hydroxy terminated chain extender. The coating has a high flexibility at a temperature of down to about −100 degrees Celsius, has a percent elongation of greater than about 100%, and has a tensile strength of greater than about 5 MPa (megapascals).

In another embodiment of the disclosure, there is provided a method of synthesizing a flexible, low temperature, filled composite material composition. The method comprises mixing an α,ω-(alpha, omega)-dihydroxy terminated polysiloxane species, a diisocyanate species, and an amine or hydroxy terminated chain extender to form a segmented copolymer elastomer. The method further comprises mixing the segmented copolymer elastomer with a solid particulate filler to form a composite material composition. The composite material composition has a high flexibility at a temperature of down to about −100 degrees Celsius, has a percent elongation of greater than about 100%, and has a tensile strength of greater than about 5 MPa (megapascals).

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 2 is a table showing the compositional ranges for polymer components used in one or more of the embodiments of the composite material compositions of the disclosure;

FIG. 3 is a table showing the mechanical behavior of unfilled composite material compositions of the disclosure;

FIG. 4 is a table showing the mechanical behavior of filled composite material compositions of the disclosure;

FIG. 8 is a table showing soak temperature, soak duration and final modulus of filled Polyurethane and composite material composition of filled Sample 3 shown in FIG. 7;

FIG. 9 is a table showing percent volume change of filled composite material compositions of the disclosure following fluid exposure; and, FIG. 10 is an illustration of a flow diagram of an embodiment of a method of synthesizing a flexible, low temperature, filled composite material composition of the disclosure.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

There are disclosed herein embodiments of flexible, low temperature, filled composite material compositions, coatings, and methods. The disclosed embodiments may be used in or on composite parts for aviation and aerospace aircraft and vehicles, watercraft, rotorcraft, automobiles, trucks, building structures, and other vehicles and craft. Composite material compositions, coatings, and methods are disclosed that combine the two properties of high mechanical tensile strength with flexibility over a broad temperature range.

In an embodiment of the disclosure, there is provided a flexible, low temperature, filled composite material composition. The composite material composition comprises a segmented copolymer elastomer comprising an $\alpha,\omega$-(alpha, omega)-dihydroxy terminated polysiloxane species, a diisocyanate species, and an amine or hydroxy terminated chain extender. The composite material composition further comprises a solid particulate filler. The composite material composition has a high flexibility at a temperature of down to about negative one hundred (−100) degrees Celsius, has a percent elongation of greater than about one hundred percent (100%), and has a tensile strength of greater than about five megapascals (5 MPa).

Figure 1A:
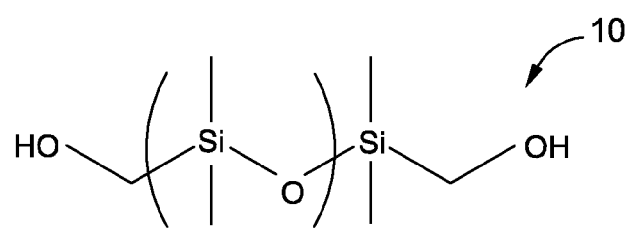
FIG. 1A is an illustration of the chemical structure of poly(dimethylsiloxane) (PDMS) used in one or more embodiments of the composite material composition of the disclosure.

The segmented copolymer elastomer comprises an $\alpha,\omega$-(alpha, omega)-dihydroxy terminated polysiloxane species. The $\alpha,\omega$-(alpha, omega)-dihydroxy terminated polysiloxane species preferably consists of poly(dimethylsiloxane) (PDMS), poly(diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-poropylsiloxane), poly(methylethylsiloxane), poly(methylhydridosiloxane), polydiethylsiloxane, or another suitable $\alpha,\omega$-(alpha, omega)-dihydroxy terminated polysiloxane species. More preferably, the $\alpha,\omega$-(alpha, omega)-dihydroxy terminated polysiloxane species is poly(dimethylsiloxane) (PDMS). FIG. 1A is an illustration of the chemical structure 10 of poly(dimethylsiloxane) (PDMS) used in one or more embodiments of the composite material compositions of the disclosure.

FIG. 2 is a table showing the compositional ranges for polymer components used in one or more of the embodiments of the composite material of the disclosure. As shown in FIG. 2, preferably, the $\alpha,\omega$-(alpha, omega)-dihydroxy terminated polysiloxane species is present in a broadest range in an amount of from about 30% by weight to about 80% by weight, based on a total weight percent of the composite material composition. More preferably, the $\alpha,\omega$-(alpha, omega)-dihydroxy terminated polysiloxane species is present in a practical range in an amount of from about 40% by weight to about 65% by weight, based on a total weight percent of the composite material composition. Most preferably, the $\alpha,\omega$-(alpha, omega)-dihydroxy terminated polysiloxane species is present at a preferred target in an amount of 52% by weight of the composite material composition, based on a total weight percent of the composite material composition.

The $\alpha,\omega$-(alpha, omega)-dihydroxy terminated polysiloxane species may comprise one or more $\alpha,\omega$-(alpha, omega)-dihydroxy terminated polysiloxane first soft segments having an average molecular weight of between about 2500 grams per mole to about 10,000 grams per mole. Preferably, the one or more $\alpha,\omega$-(alpha, omega)-dihydroxy terminated polysiloxane first soft segments have an average molecular weight of between about 4000 grams per mole to about 7000 grams per mole. More preferably, the one or more α,ω-(alpha, omega)-dihydroxy terminated polysiloxane first soft segments have an average molecular weight of 5000 grams per mole.

Figure 1B:
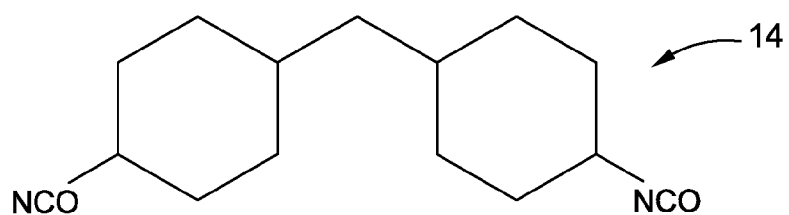
FIG. 1B is an illustration of the chemical structure of diisocyanate 4,4'-methylenebis(cyclohexyl isocyanate) (HMDI) used in one or more of the embodiments of the composite material composition of the disclosure.

The segmented copolymer elastomer further comprises a diisocyanate species. In another embodiment, the segmented copolymer elastomer comprises one or more diisocyanate species. The diisocyanate species preferably consists of 4,4'-methylenebis(cyclohexyl isocyanate) (HMDI—hexamethylene diisocyanate), cycloalkyl based diisocyanates, tolylene-2,4-diisocyante (TDI), 4,4'-methylenebis(phenyl isocyanate) (MDI), isophorone diisocyanate (IDI), or another suitable diisocyanate species. More preferably, the diisocyanate species is 4,4'-methylenebis(cyclohexyl isocyanate) (HMDI—hexamethylene diisocyanate). FIG. 1B is an illustration of the chemical structure 14 of diisocyanate 4,4'-methylenebis(cyclohexyl isocyanate) (HMDI) used in one or more of the embodiments of the composite material compositions of the disclosure.

As shown in FIG. 2, preferably, the diisocyanate species is present in a broadest range in an amount of from about 5% by weight to about 40% by weight, based on a total weight percent of the composite material composition. More preferably, the diisocyanate species is present in a practical range in an amount of from about 10% by weight to about 20% by weight, based on a total weight percent of the composite material composition. Most preferably, the diisocyanate species is present at a preferred target in an amount of 16% by weight, based on a total weight percent of the composite material composition.

Figure 1C:
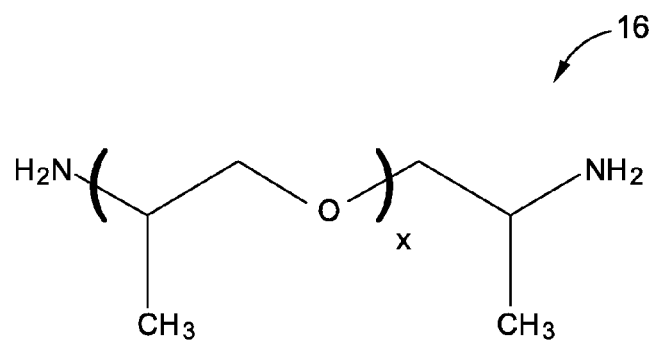
FIG. 1C is an illustration of the chemical structure of an amine terminated chain extender poly(propylene oxide) used in one or more of the embodiments of the composite material composition of the disclosure.
Figure 1D:
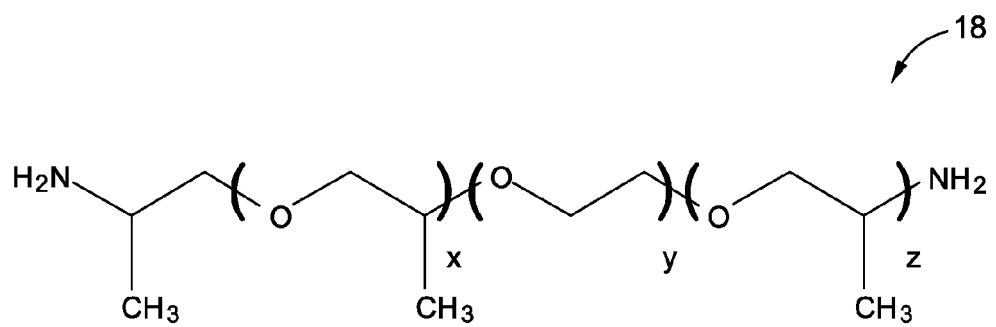
FIG. 1D is an illustration of the chemical structure of an amine terminated chain extender of a copolymer of poly(ethylene oxide) and poly(propylene oxide) used in one or more of the embodiments of the composite material composition of the disclosure.

The segmented copolymer elastomer further comprises the amine or hydroxy terminated chain extender, also known as a curative. The amine or hydroxy terminated chain extender preferably comprises a linear α,ω-(alpha, omega) amino or hydroxy end terminated oligomeric species consisting of an oligomeric diol or amine polyether, a linear polyether, poly(ethylene oxide), poly(propylene oxide), poly(propylene oxide)diamine, a copolymer of poly(ethylene oxide) and poly(propylene oxide), a linear polycarbonate, a mixture of two or more thereof, or another suitable amine or hydroxy terminated chain extender. More preferably, the amine or hydroxy terminated chain extender may comprise an amine terminated poly(propylene oxide) (also referred to as poly(propylene oxide)diamine), such as, for example, JEFFAMINE D400. (JEFFAMINE is a registered trademark of Huntsman Corporation of The Woodlands, Tex.) (JEFFAMINE D400 is a difunctional, primary amine with an average molecular weight of about 430. The primary amine groups are located on secondary carbon atoms at the end of the aliphatic polyether chains.) FIG. 1C is an illustration of the chemical structure 16 of the amine terminated chain extender poly(propylene oxide) (JEFFAMINE D400) used in one or more of the embodiments of the composite material composition of the disclosure. In addition, more preferably, the amine or hydroxy terminated chain extender may comprise a copolymer of poly(ethylene oxide) and poly(propylene oxide), such as for example, JEFFAMINE ED600. (JEFFAMINE is a registered trademark of Huntsman Corporation of The Woodlands, Tex.) (JEFFAMINE ED600 is an aliphatic polyether diamine (polyetheramine) derived from a propylene oxide-capped polyethylene glycol and has an approximate molecular weight of 600. Primary amino groups are attached to the end of a polyether backbone that may be based on propylene oxide, ethylene oxide, or a combination of propylene oxide and ethylene oxide.) FIG. 1D is an illustration of the chemical structure 18 of the amine terminated chain extender of a copolymer of poly(ethylene oxide) and poly(propylene oxide) (JEFFAMINE ED600) used in one or more of the embodiments of the composite material composition of the disclosure.

As shown in FIG. 2, preferably, the amine or hydroxy terminated chain extender (curative) is present in a broadest range in an amount of from about 10% by weight to about 50% by weight, based on a total weight percent of the composite material composition. More preferably, the amine or hydroxy terminated chain extender (curative) is present in a practical range in an amount of from about 20% by weight to about 40% by weight, based on a total weight percent of the composite material composition. Most preferably, the amine or hydroxy terminated chain extender (curative) is present at a preferred target in an amount of 31% by weight, based on a total weight percent of the composite material composition.

Preferably, the amine or hydroxy terminated chain extender is a linear α,ω-(alpha, omega) amino or hydroxy end terminated oligomeric species, such as a linear polyether or polycarbonate, having an average molecular weight of the extended chains of equal to or greater than 400 grams per mole. More preferably, the amine or hydroxy terminated chain extender is a linear α,ω-(alpha, omega) amino or hydroxy end terminated oligomeric species, such as a linear polyether or polycarbonate, having an average molecular weight of the extended chains of 400 grams per mole to about 5000 grams per mole. Most preferably, the amine or hydroxy terminated chain extender is a linear α,ω-(alpha, omega) amino or hydroxy end terminated oligomeric species, such as a linear polyether or polycarbonate, having an average molecular weight of the extended chains of 400 grams per mole to about 2000 grams per mole.

A combination of the diisocyanate species and the amine or hydroxy terminated chain extender may comprise one or more hard segments. The components are added at a ratio such that the equivalent functional groups of isocyanate species are stoichiometrically equal to the total hydroxy and/or amine species in the composition. Preferably, the one or more hard segments comprised of a combination of one or more diisocyanate species and one or more amine or hydroxy chain extenders is present in an amount of from about 5% by weight to about 60% by weight, based on a total weight percent of the composite material composition. More preferably, the one or more hard segments comprised of a combination of one or more diisocyanate species and one or more amine or hydroxy chain extenders is present in an amount of from about 15% by weight to about 40% by weight, based on a total weight percent of the composition. Most preferably, the one or more hard segments comprised of a combination of one or more diisocyanate species and one or more amine or hydroxy chain extenders is present in an amount of 25% by weight, based on a total weight percent of the composition.

The composite material composition further comprises a solid particulate filler. The solid particulate filler preferably comprises or consists of a pulverized or powdered metal, a pulverized or powdered salt, a pulverized or powdered inorganic oxide, a pulverized or powdered carbon, a pulverized or powdered ceramic, a mixture of two or more thereof, or another suitable solid particulate filler. More preferably, the pulverized or powdered metal comprises or consists of a pulverized or powdered—iron, aluminum, silicon, titanium, chromium, manganese, cobalt, nickel, copper, zinc, palladium, silver, cadmium, tin, tantalum, vanadium, neodymium, samarium, yttrium, tungsten, platinum, gold, and combinations thereof in the form of alloys, or another suitable pulverized or powdered metal. More preferably, the pulverized or powdered inorganic oxide and pulverized or powdered ceramic comprises or consists of ceramics; inorganic oxide compounds where the anion is oxygen ($O^{2-}$) including alumina, silica, zirconia, yttria, ceria, oxides of tin and zinc; inorganic oxide compounds where the anion is carbonate ($CO_3^{2-}$) including calcium carbonate, potassium carbonate, sodium carbonate, iron carbonate, and ammonium carbonate; inorganic oxide compounds where the anion is phosphate ($PO_4^{2-}$) including minerals in the apatite group; or another suitable pulverized or powdered inorganic oxide or ceramic. More preferably, the pulverized or powdered carbon comprises or consists of elemental non-metallics such as carbons in the form of graphite, carbon nanotubes, carbon fiber, carbon black, coke or another suitable pulverized or powdered carbon. The solid particulate filler may be present in an amount of about 5 volume percent (vol %) to about 70 volume percent (vol %), based on a total volume percent (vol %) of the composite material composition. Preferably, the solid particulate filler may be present in an amount of about 10 volume percent (vol %) to about 60 volume percent (vol %), based on a total volume percent (vol %) of the composite material composition. More preferably, the solid particulate filler may be present in an amount of greater than or equal to 40 volume percent (vol %), based on a total volume percent (vol %) of the composite material composition. Most preferably, the solid particulate filler may be present in an amount of about 30 volume percent (vol %) to about 40 volume percent (vol %), based on a total volume percent (vol %) of the composite material composition.

In another embodiment of the disclosure, there is provided a flexible, low temperature, filled composite coating. The coating comprises a composite material composition comprising a segmented copolymer elastomer and a solid particulate filler. The segmented copolymer elastomer comprises an α,ω-(alpha, omega)-dihydroxy terminated polysiloxane species, a diisocyanate species, and an amine or hydroxy terminated chain extender. The coating has a high flexibility at a temperature of down to about −100 degrees Celsius, has a percent elongation of greater than about 100%, and has a tensile strength of greater than about 5 MPa (megapascals).

As discussed in detail above, the α,ω-(alpha, omega)-dihydroxy terminated polysiloxane species preferably consists of poly(dimethylsiloxane) (PDMS), poly(diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-poropylsiloxane), poly(methylethylsiloxane), poly(methylhydridosiloxane), polydiethylsiloxane, or another suitable α,ω-(alpha, omega)-dihydroxy terminated polysiloxane species. More preferably, the α,ω-(alpha, omega)-dihydroxy terminated polysiloxane species is poly(dimethylsiloxane) (PDMS).

As discussed in detail above, the diisocyanate species preferably consists of 4,4'-methylenebis(cyclohexyl isocyanate) (HMDI—Hexamethylene diisocyanate), cycloalkyl based diisocyanates, tolylene-2,4-diisocyante (TDI), 4,4'-methylenebis(phenyl isocyanate) (MDI), isophorone diisocyanate (IDI), or another suitable diisocyanate species. More preferably, the diisocyanate species is 4,4'-methylenebis(cyclohexyl isocyanate) (HMDI—Hexamethylene diisocyanate).

As discussed in detail above, the amine or hydroxy terminated chain extender preferably comprises a linear α,ω-(alpha, omega) amino or hydroxy end terminated oligomeric species consisting of an oligomeric diol or amine polyether, a linear polyether, poly(ethylene oxide), poly(propylene oxide), poly(propylene oxide)diamine, a copolymer of poly (ethylene oxide) and poly(propylene oxide), a linear polycarbonate, a mixture of two or more thereof, or another suitable amine or hydroxy terminated chain extender. More preferably, the amine or hydroxy terminated chain extender may comprise an amine terminated poly(propylene oxide) (also referred to as poly(propylene oxide)diamine), such as, for example, JEFFAMINE D400 (see FIG. 1C). (JEFFAMINE is a registered trademark of Huntsman Corporation of The Woodlands, Tex.) In addition, more preferably, the amine or hydroxy terminated chain extender may comprise a copolymer of poly(ethylene oxide) and poly(propylene oxide), such as for example, JEFFAMINE ED600 (see FIG. 1D). (JEFFAMINE is a registered trademark of Huntsman Corporation of The Woodlands, Tex.)

As discussed in detail above, the solid particulate filler preferably comprises or consists of a pulverized or powdered metal, a pulverized or powdered salt, a pulverized or powdered inorganic oxide, a pulverized or powdered carbon, a pulverized or powdered ceramic, a mixture of two or more thereof, or another suitable solid particulate filler. More preferably, the pulverized or powdered metal comprises or consists of a pulverized or powdered—iron, aluminum, silicon, titanium, chromium, manganese, cobalt, nickel, copper, zinc, palladium, silver, cadmium, tin, tantalum, vanadium, neodymium, samarium, yttrium, tungsten, platinum, gold, and combinations thereof in the form of alloys, or another suitable pulverized or powdered metal. More preferably, the pulverized or powdered inorganic oxide and pulverized or powdered ceramic comprises or consists of ceramics; inorganic oxide compounds where the anion is oxygen ($O^{2-}$) including alumina, silica, zirconia, yttria, ceria, oxides of tin and zinc; inorganic oxide compounds where the anion is carbonate ($CO_3^{2-}$) including calcium carbonate, potassium carbonate, sodium carbonate, iron carbonate, and ammonium carbonate; inorganic oxide compounds where the anion is phosphate ($PO_4^{2-}$) including minerals in the apatite group; or another suitable pulverized or powdered inorganic oxide or ceramic. More preferably, the pulverized or powdered carbon comprises or consists of elemental non-metallics such as carbons in the form of graphite, carbon nanotubes, carbon fiber, carbon black, coke or another suitable pulverized or powdered carbon.

The composite material compositions of the disclosed embodiments preferably have a high flexibility at a temperature of down to about −100 (negative one hundred) degrees Celsius. Preferably, the composite material compositions of the disclosed embodiments further have a percent elongation of greater than about 100%. Preferably, the composite material compositions of the disclosed embodiments further have a tensile strength of greater than about 5 MPa (five megapascals).

Figure 10:
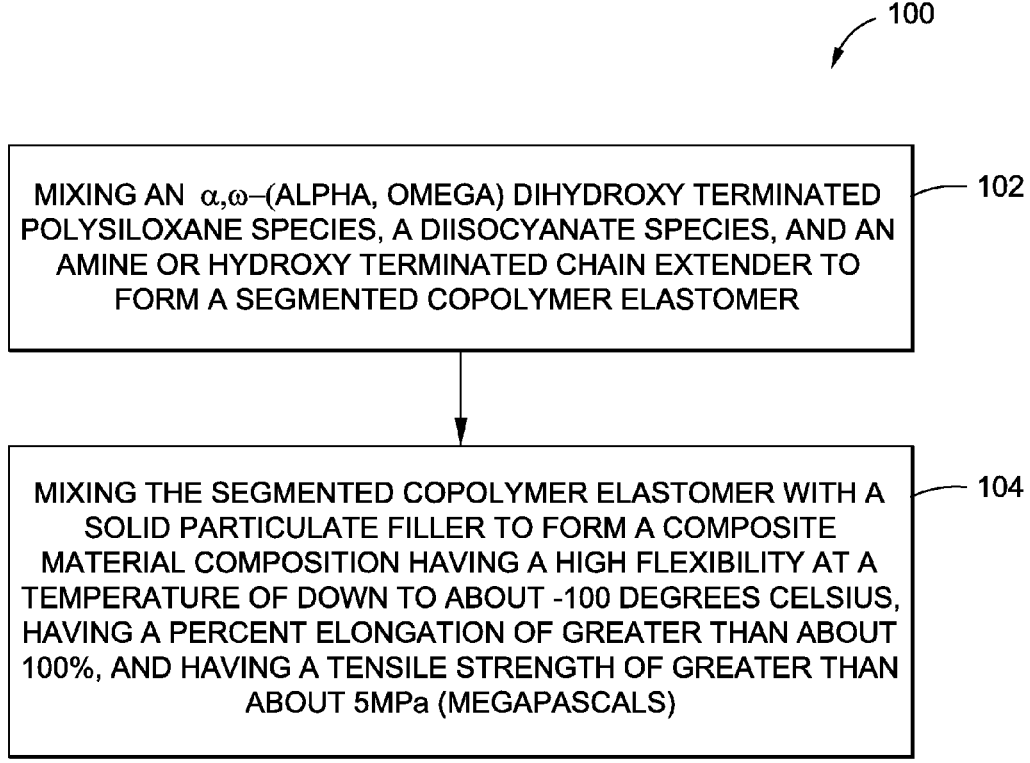

In another embodiment of the disclosure, there is provided a method 100 of synthesizing a flexible, low temperature, filled composite material composition. FIG. 10 is an illustration of a flow diagram of an embodiment of a method of synthesizing a composite material composition of the disclosure. The method 100 comprises step 102 of mixing an α,ω-(alpha, omega)-dihydroxy terminated polysiloxane species, a diisocyanate species, and an amine or hydroxy terminated chain extender to form a segmented copolymer elastomer. The α,ω-(alpha, omega)-dihydroxy terminated polysiloxane species, the diisocyanate species, and the amine or hydroxy terminated chain extender are discussed in detail above with respect to the composite material compositions and preferred compounds.

The step 102 of the method 100 may further comprise mixing one or more of the α,ω-(alpha, omega)-dihydroxy terminated polysiloxane species, the diisocyanate species, and the amine or hydroxy terminated chain extender together in a solvent to form the segmented copolymer elastomer. The components may be added at a ratio such that the equivalents of diisocyanate species are stoichiometrically equal to the total amine or hydroxy terminated chain extender species in the composition. Preferably, the solvent is a secondary or tertiary alcohol or ketone. More preferably, the solvent is isopropanol, methylethyl ketone, or methylisobutyl ketone. The method may further comprise removing the solvent. In one embodiment of the method, the solvent is not removed and the composite material composition remains in solution for subsequent use.

The method 100 further comprises step 104 of mixing the segmented copolymer elastomer with a solid particulate filler to form a composite material composition. The solid particulate filler is discussed in detail above with respect to the composite material compositions. The composite material composition preferably has a high flexibility at a temperature of down to about −100 degrees Celsius, has a percent elongation of greater than about 100%, and has a tensile strength of greater than about 5 MPa (megapascals). The step 104 of mixing the segmented copolymer elastomer with the solid particulate filler may comprise mixing the solid particulate filler in an amount 5 volume percent (vol %) to about 70 volume percent (vol %), based on a total volume percent (vol %) of the composite material composition, such as the mixture of the segmented copolymer elastomer and the solid particulate filler; preferably mixing the solid particulate filler in an amount 10 volume percent (vol %) to about 60 volume percent (vol %), based on a total volume percent (vol %) of the composite material composition, such as the mixture of the segmented copolymer elastomer and the solid particulate filler; more preferably, mixing the solid particulate filler in an amount of greater than or equal to 40 volume percent (vol %), based on a total volume percent (vol %) of the composite material composition, such as the mixture of the segmented copolymer elastomer and the solid particulate filler; or most preferably, mixing the solid particulate filler in an amount of about 30 volume percent (vol %) to about 40 volume percent (vol %), based on a total volume percent (vol %) of the composite material composition, such as the mixture of the segmented copolymer elastomer and the solid particulate filler. The step 104 of mixing the segmented copolymer elastomer with the solid particulate filler may further comprise adding a fumed silica as a reinforcing filler.

The method 100 may further comprise formulating the composite material composition into a solution for application via a spray coating method to a surface to be exposed to extended, subfreezing temperatures, such as down to −100 degrees Celsius. This may be applied to a surface at a later time convenient for a user. In an exemplary embodiment, the composite material composition in the form of a coating may be applied to surfaces via spray coating directly from solution. In another embodiment of the method, the segmented copolymer elastomer may be prepared separately and may be able to be stored long term prior to the addition of a solvent and combination to form the final product. Spray coating methods or processes that may be used may comprise known spray coating methods or processes used by those skilled in the art. Examples may include thermal spray processes, high-volume low-pressure spray processes, plasma spray processes, vapor deposition processes, or other suitable spray processes.

EXAMPLES

Various embodiments of the composite material compositions discussed above were prepared and various mechanical tests were performed. Unfilled samples were prepared for unfilled Polyurethane and unfilled Samples 1-3 (see FIGS. 3, 5) in Examples 1-3 (see also discussion of FIG. 5 below). Filled samples were prepared for filled Polyurethane and filled Samples 1-3 (see FIG. 4) in Examples 4-7. FIG. 2 is a table showing the compositional ranges for polymer components used in the composite material compositions. FIG. 3 is a table showing the mechanical behavior of unfilled composite material compositions. FIG. 4 is a table showing the mechanical behavior of filled composite material compositions. Experiments were conducted with unfilled and filled composite material compositions in order to demonstrate the need to remove polyether segments to achieve low temperature (<−50° C. (less than negative fifty degrees Celsius)) flexibility.

Materials and Methods.

All items were used as received without further purification. To prepare the sample composite material compositions, the following materials were obtained: (1) aerospace polyurethane resin samples (both unfilled with particulate filler and filled with particulate filler); (2) α,ω-(alpha, omega)-dihydroxy terminated poly(dimethylsiloxane) (PDMS) was obtained from Gelest, Inc. of Morrisville, Pa. (for example, α,ω-dihydroxy terminated poly(dimethylsiloxane) (PDMS) soft segments having an average molecular weight of approximately 5000 g/mol (grams per mole)); (3) 4,4'-methylenebis(cyclohexyl isocyanate) (HMDI) was obtained from Sigma-Aldrich of St. Louis, Mo.; (4) amine or hydroxy terminated chain extenders of linear α,ω-(alpha, omega) amino or hydroxy end terminated oligomeric species, such as amine terminated poly(propylene oxide) (JEFFAMINE D400), and a copolymer of poly(ethylene oxide) and poly(propylene oxide) (JEFFAMINE ED600), were obtained from Huntsman Corporation of The Woodlands, Tex. (JEFFAMINE is a registered trademark of Huntsman Corporation of The Woodlands, Tex.); (5) isopropanol solvent was obtained from Mallinckrodt Baker of Phillipsburg, N.J., and the isopropanol was dried over activated 4 Å (Angstrom) molecular sieves; (6) triethylamine was obtained from Sigma-Aldrich of St. Louis, Mo. and was dried over $CaH_2$ (calcium hydride) also obtained from Sigma-Aldrich of St. Louis, Mo., and was distilled; and (7) solid particulate filler material in the form of a commercially available metal iron powder, such as available from BASF Corporation of Florham Park, N.J., was used.

Tensile testing was performed on an INSTRON 5565 tensile testing machine obtained from Instron of Norwood, Mass. (INSTRON is a registered trademark owned by Illinois Tool Works Inc. of Glenview, Ill.) using a crosshead speed of 2.5 mm/min (millimeters per minute). Dynamic mechanical analysis was performed on a DMA Q800 dynamic mechanical analysis machine obtained from TA Instruments of New Castle, Del. Scans were run at a frequency of 1 Hz (one Hertz) with a temperature ramp rate of 3° C./min (three degrees Celsius per minute).

Films were cast from shallow PTFE (polytetrafluoroethylene) molds of either two (2) inches by two (2) inches or three (3) inches by three (3) inches in area. Viscous polymer solution was poured into the shallow tray and covered to allow the film to flow and achieve a uniform thickness for mechanical testing samples. The cover was then removed and the solvent allowed to evaporate. Films were then placed in a vacuum chamber to ensure removal of residual solvent.

Example 1

Unfilled Aerospace Polyurethane Resin ("Unfilled Polyurethane")

In Example 1, an unfilled Polyurethane sample was charged to a vial and combined with a curative. Methyl ethyl ketone (MEK) was added as necessary to dilute the viscous resin to that of a pourable viscosity and the transferred into a 3 inch by 3 inch PTFE (polytetrafluoroethylene) mold and covered overnight. The MEK was then removed through evaporation to produce a film (approximately 0.5 mm (millimeters) thick) for use in mechanical testing.

Tensile testing was performed with the unfilled Polyurethane sample and a percent (%) elongation obtained was 566+/−86% (see FIG. 3), and a tensile strength obtained was 58+/−11.9 MPa (megapascals) (see FIG. 3). Dynamic mechanical analysis was performed with the unfilled Polyurethane sample with results shown in FIG. 5.

Example 2

Unfilled PDMS 5k/HMDI/DAC Sample 1

In Example 2, unfilled PDMS 5k/HMDI/DAC Sample 1 was prepared. PDMS-$\alpha,\omega$-dihydroxy terminated poly(dimethylsiloxane) (5.0 g, 0.893 mmoles) and HMDI (1.17 g, 4.46 mmoles) were charged to a vial and stirred with heating at 100° C. for eight (8) hours with triethylamine as catalyst (40 mg) in a Nitrogen glove box. The mixture was then cooled to ambient temperature. Isopropanol (8 g) dried over 4 Angstrom molecular sieves was added to the mixture and stirred until the mixture was homogeneous. In a separate vial, DAC was measured (407 mg, 3.57 mmoles) and dissolved in isopropanol (2 g) that had been dried over 4 Angstrom molecular sieves. These two solutions were combined and vigorously mixed. After approximately five (5) minutes, the solution was poured into a three inch by three inch (3"×3") PTFE (polytetrafluoroethylene) mold and covered overnight. The isopropanol was then removed through evaporation to produce a film (approximately 0.5 mm thick) for use in mechanical testing.

Tensile testing was performed with the unfilled PDMS 5k/HMDI/DAC Sample 1 and a percent (%) elongation obtained was 473+/−91% (see FIG. 3), and a tensile strength obtained was 48+/−14.2 MPa (megapascals) (see FIG. 3). Dynamic mechanical analysis was performed with the unfilled PDMS 5k/HMDI/DAC Sample 1 with results shown in FIG. 5.

Example 3

Unfilled PDMS 5k/HMDI/ED600 Sample 3

In Example 3, unfilled PDMS 5k/HMDI/ED600 Sample 3 was prepared. For the initial prepolymer resin synthesis for Sample 3, $\alpha,\omega$-(alpha, omega)-dihydroxy terminated poly(dimethylsiloxane) (PDMS) (500 g, 100 mmoles) was charged to a three necked 1000 mL (milliliter) flask. HMDI (157.2 g, 600 mmoles) was then added and an overhead TEFLON (TEFLON is a registered trademark of E.I. Du Pont De Nemours and Company of Wilmington, Del.) paddle stirrer was fitted through an adapter in the center neck. The atmosphere of the headspace in the flask was continuously purged with nitrogen during the course of the reaction. An oil bath was placed under the flask and set to 110° C. (degrees Celsius) while the paddle stirrer was adjusted to 300 rpm (revolutions per minute). Upon reaching a reaction temperature of 110° C., triethylamine (0.5 mL) was introduced into the reaction and allowed to mix for three hours (3 hrs). Another aliquot of triethylamine (0.5 mL) was added and the reaction left overnight to stir. The next morning the resin mixture was found to be clear and a final aliquot of triethylamine (0.5 mL) was introduced before heating for two (2) additional hours. Heat was then removed and the resin allowed to cool to ambient temperature where it remained clear.

The prepared prepolymer resin (150 g) was weighed into an empty half (½) gallon paint can where it was diluted with a total of 975 g MEK (methyl ethyl ketone)+109 g MIBK (methyl isobutyl ketone)/Cyclohexanone. This solution was dispersed on a paint can shaker and a copolymer of poly (ethylene oxide) and poly(propylene oxide) (JEFFAMINE ED600) (58.71 g) was slowly added with gentle mixing to prevent aggregates. The polymer solution was then sprayed onto an aluminum panel using multiple passes. The thickness of the coating was increased as desired and allowed to dry over many hours before being transferred to a 120° F. (degrees Fahrenheit) oven overnight.

Tensile testing was performed with the unfilled PDMS 5k/HMDI/ED600 Sample 3 and a percent (%) elongation obtained was 2700+/−360% (see FIG. 3), and a tensile strength obtained was 7.0+/−1.9 MPa (megapascals) (see FIG. 3). Dynamic mechanical analysis was performed with the unfilled PDMS 5k/HMDI/ED600 Sample 1 with results shown in FIG. 5.

Example 4

Filled Aerospace Polyurethane Resin ("Filled Polyurethane")

In Example 4, a filled Polyurethane sample was charged to a vial and combined with a curative. Methyl ethyl ketone (MEK) was added to dilute the mixture to a thin viscosity and solid particulate filler in the form of a metal iron powder was then added (40% volume final composition) using a COWLES dispersing blade apparatus (COWLES is a registered trademark of Morehouse Cowles of Chino, Calif.). During the addition, MEK was added as necessary to maintain an acceptable spray viscosity. The polymer solution was then sprayed onto an aluminum panel using multiple passes with approximately seven (7) minute intervals to allow carrier solvent to flash off. Thickness of the coating was increased as desired and allowed to dry over many hours before being transferred to a 120° F. (degrees Fahrenheit) oven overnight.

Tensile testing was performed with the filled Polyurethane sample and a percent (%) elongation obtained was 214+/−5.5% (see FIG. 4), and a tensile strength obtained was 31.2+/−1.4 MPa (megapascals) (see FIG. 4). Dynamic mechanical analysis was performed with the filled Polyurethane sample with results shown in FIG. 6.

Example 5

Filled PDMS 5k/HMDI/DAC Sample 1

In Example 5, a filled PDMS 5k/HMDI/DAC Sample 1 was prepared. PDMS-$\alpha,\omega$-(alpha, omega)-dihydroxy terminated poly(dimethylsiloxane) (5.0 g, 0.893 mmoles) and HMDI (1.17 g, 4.46 mmoles) were charged to a vial and stirred with heating at 100° C. for eight (8) hours with triethylamine as a catalyst (20 mg) in a Nitrogen glove box. The mixture was then cooled to ambient temperature. Isopropanol (8 g) dried over 4 Angstrom molecular sieves was added to the mixture and stirred until the mixture was homogeneous. In a separate vial, DAC was measured (407 mg, 3.57 mmoles) and dissolved in isopropanol (2 g) that had been dried over 4 Angstrom molecular sieves along with fine iron powder (27.2 g, 40 vol % total). These two solutions were combined and vigorously mixed. After approximately five (5) minutes, the solution was poured into a three inch by three inch (3"×3") PTFE (Polytetrafluoroethylene) mold and covered overnight. The isopropanol was then removed through evaporation to produce a film (approximately 0.5 mm thick) for use in mechanical testing.

Tensile testing was performed with the filled PDMS 5k/HMDI/DAC Sample 1 and a percent (%) elongation obtained was 5.7+/−0.8% (see FIG. 4), and a tensile strength obtained was 3.3+/−0.3 MPa (megapascals) (see FIG. 4).

Example 6

Filled PDMS 5k/HMDI/D400 Sample 2

In Example 6, a filled PDMS 5k/HMDI/D400 Sample 2 was prepared. For the initial prepolymer resin synthesis for filled PDMS 5k/HMDI/D400 Sample 2, PDMS-α,ω-(alpha, omega)-dihydroxy terminated poly(dimethylsiloxane) (600 g, 120 mmoles) was charged to a three necked 1000 mL flask. HMDI (125.8 g, 480 mmoles) was then added and an overhead TEFLON (TEFLON is a registered trademark of E.I. Du Pont De Nemours and Company of Wilmington, Del.) paddle stirrer was fitted through an adapter in the center neck. The atmosphere of the headspace in the flask was continuously purged with nitrogen during the course of the reaction. An oil bath was placed under the flask and set to 110° C. while the paddle stirrer was adjusted to 300 rpm (revolutions per minute). Upon reaching a reaction temperature of 110° C., triethylamine (0.5 mL) was introduced into the reaction and allowed to mix for three (3) hours. Another aliquot of triethylamine (0.5 mL) was added and the reaction was left overnight to stir. The next morning, the resin mixture was found to be clear and a final aliquot of triethylamine (0.5 mL) was introduced before heating for two (2) additional hours. Heat was then removed and the resin allowed to cool where it remained clear. (As shown in FIG. 3, the percent (%) elongation and tensile strength for unfilled PDMS 5k/HMDI/D400 Sample 2 was not measured, but the dynamic mechanical analysis was performed with the unfilled PDMS 5k/HMDI/D400 Sample 2, with the results shown in FIG. 5).

To prepare the filled PDMS 5k/HMDI/D400 Sample 2, the prepared prepolymer resin (150 g) was weighed into an empty quart paint can. Solid particulate filler in the form of fine metal iron powder was then added at 6.15 parts to 1.00 part prepolymer resin (922.5 g fine metal iron powder for a 40% vol final composition) slowly while mixing under slow speed with a COWLES dispersing blade apparatus (COWLES is a registered trademark of Morehouse Cowles of Chino, Calif.). No solvent was added at this time as the heat and power of the blade was adequate to homogenize the mixture. Once all the metal iron powder was added, a nitrogen blanket was placed over the headspace of the can and the blade speed was increased to 3000 rpm. The resin was mixed for twenty (20) minutes or until the temperature rose to approximately 110° C. (degrees Celsius). If excessive heat was an issue, slower mix speeds could be used. Following homogenization, the can was capped, a nitrogen blanket placed in the can headspace and the mixture left to cool to room temperature.

The mixture was next transferred to a one-half (½) gallon paint can where it was diluted with a total of 975 g MEK (methyl ethyl ketone)+109 g MIBK (methyl isobutyl ketone)/Cyclohexanone. This was next dispersed on a paint can shaker and amine terminated poly(propylene oxide) (JEFFAMINE D400) (34 g) was slowly added with gentle mixing to prevent aggregates.

The polymer solution was then sprayed onto an aluminum panel using multiple passes. Thickness of the coating was increased as desired and allowed to dry over many hours before being transferred to a 120° F. (degrees Fahrenheit) oven overnight.

Tensile testing was performed with the filled PDMS 5k/HMDI/D400 Sample 2 and a percent (%) elongation obtained was 87.2+/−1.3% (see FIG. 4), and a tensile strength obtained was 3.0+/−0.4 MPa (megapascals) (see FIG. 4). Dynamic mechanical analysis was performed with the filled Sample 2 with results shown in FIG. 6.

Example 7

Filled PDMS 5k/HMDI/ED600+2% CAB-O-SIL Sample 3

In Example 7, a filled PDMS 5k/HMDI/ED600+2% CAB-O-SIL Sample 3 cast film was prepared. (CAB-O-SIL is a registered trademark of Cabot Corporation of Boston, Mass.) For the initial prepolymer resin synthesis for filled PDMS 5k/HMDI/ED600+2% CAB-O-SIL Sample 3, α,ω-(alpha, omega)-dihydroxy terminated poly(dimethylsiloxane) (PDMS) (500 g, 100 mmoles) was charged to a three necked 1000 mL (milliliter) flask. HMDI (157.2 g, 600 mmoles) was then added and an overhead TEFLON (TEFLON is a registered trademark of E.I. Du Pont De Nemours and Company of Wilmington, Del.) paddle stirrer was fitted through an adapter in the center neck. The atmosphere of the headspace in the flask was continuously purged with nitrogen during the course of the reaction. An oil bath was placed under the flask and set to 110° C. (degrees Celsius) while the paddle stirrer was adjusted to 300 rpm (revolutions per minute). Upon reaching a reaction temperature of 110° C., triethylamine (0.5 mL) was introduced into the reaction and allowed to mix for three hours (3 hrs). Another aliquot of triethylamine (0.5 mL) was added and the reaction left overnight to stir. The next morning the resin mixture was found to be clear and a final aliquot of triethylamine (0.5 mL) was introduced before heating for two (2) additional hours. Heat was then removed and the resin allowed to cool to ambient temperature where it remained clear.

To prepare the filled PDMS 5k/HMDI/ED600+2% CAB-O-SIL Sample 3, the prepared prepolymer resin (150 g) was weighed into an empty quart paint can. Solid particulate filler in the form of fine metal iron powder was then added (1054.5 g metal iron powder for a 40% volume final composition) slowly while mixing under slow speed with a COWLES dispersing blade apparatus (COWLES is a registered trademark of Morehouse Cowles of Chino, Calif.). Next CAB-O-SIL fumed silica was added (4.2 g). No solvent was added at this time as the heat and power of the blade was adequate to homogenize the mixture. Once all the fine metal iron powder was added, a nitrogen blanket was placed over the headspace of the can and the blade speed was increased to 3000 rpm. The resin was mixed for twenty (20) minutes or until the temperature rose to approximately 110° C. (degrees Celsius). If excessive heat was an issue, slower mix speeds could be used. Following homogenization, the can was capped, a nitrogen blanket placed in the can headspace and the mixture left to cool to room temperature.

The mixture was next transferred to a one-half (½) gallon paint can where it was diluted with a total of 975 g MEK (methyl ethyl ketone)+109 g MIBK (methyl isobutyl ketone)/Cyclohexanone. This was next dispersed on a paint can shaker and a copolymer of poly(ethylene oxide) and poly (propylene oxide) (JEFFAMINE ED600) (58.71 g) was slowly added with gentle mixing to prevent aggregates. The polymer solution was then sprayed onto an aluminum panel using multiple passes. The thickness of the coating was increased as desired and allowed to dry over many hours before being transferred to a 120° F. (degrees Fahrenheit) oven overnight.

Tensile testing was performed with the filled PDMS 5k/HMDI/ED600+2% CAB-O-SIL Sample 3 and a percent (%) elongation obtained was 237+/−8.6 and a tensile strength obtained was 11.2+/−0.3 MPa (megapascals) (see FIG. 4). Dynamic mechanical analysis was performed with the filled PDMS 5k/HMDI/ED600+2% CAB-O-SIL Sample 3 with results shown in FIG. 6.

Example 8

Fluid Tests

In Example 8, fluid compatibility testing was performed by submerging test strips of composite material compositions having solid particulate filler into fluids over a fixed time and temperature. Test materials were approximately 30 mm (millimeters) in length by 6 mm (millimeters) in width by 0.5 mm (millimeters) in height. Each strip was measured for both the initial dimension and mass before exposure to fluid. FIG. 9 is a table showing percent volume change of filled composite material compositions of the disclosure following fluid exposure. The table in FIG. 9 describes the fluids used, including: (1) jet fuel (such as JP8 (Jet Propellant 8)); (2) hydraulic fluid (such as CASTROL BRAYCO Micronic 882 obtained from Air BP Lubricants of Parsippany, N.J. (CASTROL and BRAYCO are registered trademarks of Castrol Industrial North America of Warrenville, Ill.)), (3) lubricating oil (such as engine oil MOBIL Jet Oil II from Exxon Mobil Corporation of Irving, Tex. (MOBIL is a registered trademark of Exxon Mobil Corporation of Irving, Tex.); and (4) water (such as deionized water). The exposure time for the jet fuel was 7 (seven) days and the exposure temperature was ambient. The exposure time for the hydraulic fluid was 7 (seven) days and the exposure temperature was ambient. The exposure time for the lubricating oil was 24 (twenty-four) hours and the exposure temperature was 120° C. The exposure time for the water was 7 (seven) days and the exposure temperature was 49° C. Following exposure, the test strips were removed from the fluid, blotted dry of any excess liquid on the surface, and both dimensions and mass were measured. The changes following exposure were recorded. FIG. 9 is shows the percent volume change following fluid exposure for the filled Polyurethane, the filled PDMS 5k/HMDI/D400 Sample 2, and the filled PDMS 5k/HMDI/ED600+2% CAB-O-SIL Sample 3.

The filled Polyurethane, filled PDMS 5k/HMDI/D400 Sample 2, and filled PDMS 5k/HMDI/ED600+2% CAB-O-SIL Sample 3 were filled with 40 vol % metal iron powder and were screened for compatibility with various fluids common to aircraft environments, including jet fuel, hydraulic fluid, lubricating oil, and water. As shown in FIG. 9, the filled Polyurethane showed a 10.7% volume change upon exposure to jet fuel for 7 days at ambient temperature; showed a 6.5% volume change upon exposure to hydraulic fluid for 7 days at ambient temperature; showed a 15.9% volume change upon exposure to lubricating oil for 24 hours at 120° C.; and, showed a 4.2% volume change upon exposure to water for 7 days at 49° C.

As further shown in FIG. 9, the filled PDMS 5k/HMDI/D400 Sample 2 showed a 125% volume change upon exposure to jet fuel for 7 days at ambient temperature; showed a 8.4% volume change upon exposure to hydraulic fluid for 7 days at ambient temperature; showed a 63% volume change upon exposure to lubricating oil for 24 hours at 120° C.; and showed a 3.5% volume change upon exposure to water for 7 days at 49° C.

As further shown in FIG. 9, the filled PDMS 5k/HMDI/ED600+2% CAB-O-SIL Sample 3 showed a 54.6% volume change upon exposure to jet fuel for 7 days at ambient temperature; showed a 9.6% volume change upon exposure to hydraulic fluid for 7 days at ambient temperature; showed a 12.7% volume change upon exposure to lubricating oil for 24 hours at 120° C.; and showed a 5.7% volume change upon exposure to water for 7 days at 49° C.

FIG. 3 is a table showing the mechanical behavior of unfilled composite material compositions of the disclosure. As discussed above, the unfilled Polyurethane showed a percent (%) elongation of 566+/−86% and a tensile strength of 58+/−11.9 MPa (megapascals). The unfilled Polyurethane showed a decrease in mechanical properties but overall maintained excellent elongation and tensile strength at room temperature. As discussed above, the unfilled PDMS 5k/HMDI/DAC Sample 1 showed a percent (%) elongation of 473+/−91 and a tensile strength of 48+/−14.2 MPa. Sample 1 was an extreme case, showing excellent mechanical properties and flexible low temperature behavior in the unfilled state. As shown in FIG. 3, the percent (%) elongation and tensile strength for the unfilled PDMS 5k/HMDI/D400 Sample 2 was not measured, but the dynamic mechanical analysis was performed with the unfilled PDMS 5k/HMDI/D400 Sample 2, with the results shown in FIG. 5. As discussed above, the unfilled PDMS 5k/HMDI/ED600 Sample 3 showed a percent (%) elongation of 2700+/−360 and a tensile strength of 7.0+/−1.9 MPa. The increased molecular weight of ED600 (poly (propylene oxide) and poly(ethylene oxide)) curative and % composition produced an unfilled material with excellent elongational performance capable of extension up to 2700% with a corresponding tensile strength of 7 MPa as shown in FIG. 3.

FIG. 4 is a table showing the mechanical behavior of filled composite material compositions of the disclosure. As discussed above, the filled Polyurethane showed a percent (%) elongation of 214+/−5.5% and a tensile strength of 31.2+/−1.4 MPa (megapascals). The unfilled Polyurethane and the filled Polyurethane did show a decrease in mechanical properties but overall they maintained excellent elongation and tensile strength at room temperature. As discussed above, the filled PDMS 5k/HMDI/DAC Sample 1 showed a percent (%) elongation of 5.7+/−0.8 and a tensile strength of 3.3+/−0.3 MPa. The filled PDMS 5k/HMDI/DAC Sample 1 showed that addition of high levels of solid particulate filler rendered filled PDMS 5k/HMDI/DAC Sample 1 rigid and brittle. As discussed above, the filled PDMS 5k/HMDI/D400 Sample 2 showed a percent (%) elongation of 87.2+/−1.3 and a tensile strength of 3.0+/−0.4 MPa. Upon incorporation of 40 vol % of a solid particulate filler, for example, metal iron powder, to PDMS 5k/HMDI/D400 Sample 2 and spray coating of the material on a surface, the mechanical properties were improved over PDMS 5k/HMDI/DAC Sample 1. FIG. 4 shows that for a 40 vol % of a solid particulate filler, for example, metal iron powder, PDMS 5k/HMDI/D400 Sample 2 increased elongation over PDMS 5k/HMDI/DAC Sample 1 from 5.7% to 87.2% while maintaining a similar tensile strength. While softening of the base material and incorporation of polyether curatives improved mechanical properties of the filled PDMS 5k/HMDI/D400 Sample 2 over the filled PDMS 5k/HMDI/DAC Sample 1, the reduced crosslinking density from modifying isocyanate to siloxane ratios and increased molecular weight of curative also produced a material that softened rapidly with increased temperature by showing a modulus of <0.1 MPa above 130° C. This decreased crosslinking also appeared as a weakening with temperature in the 40 vol % solid particulate filler, for example, metal iron powder, filled samples (see FIG. 6) that showed a material that softened to <1 MPa at 120° C. In addition, the ability of filled PDMS 5k/HMDI/D400 Sample 2 to resist swelling upon exposure to solvent (see FIG. 9), particularly lubricating oil and jet fuel, was poor compared to the filled Polyurethane. In order to address these shortcomings, filled PDMS 5k/HMDI/D400 Sample 2 was modified further to: 1) increase the ratio of isocyanate to siloxane in order to improve high temperature performance; and 2) increase molecular weight of the curative to compensate for the stiffening effect of modification 1; and 3) incorporate 2% fumed silica (CAB-O-SIL) as a reinforcing filler. (CAB-O-SIL is a registered trademark of Cabot Corporation of Boston, Mass.) As discussed above and shown in FIG. 4, the filled PDMS 5k/HMDI/ED600+2% CAB-O-SIL Sample 3 showed a percent (%) elongation of 237+/−8.6 and a tensile strength of 11.2+/−0.3 MPa.

Figure 5:
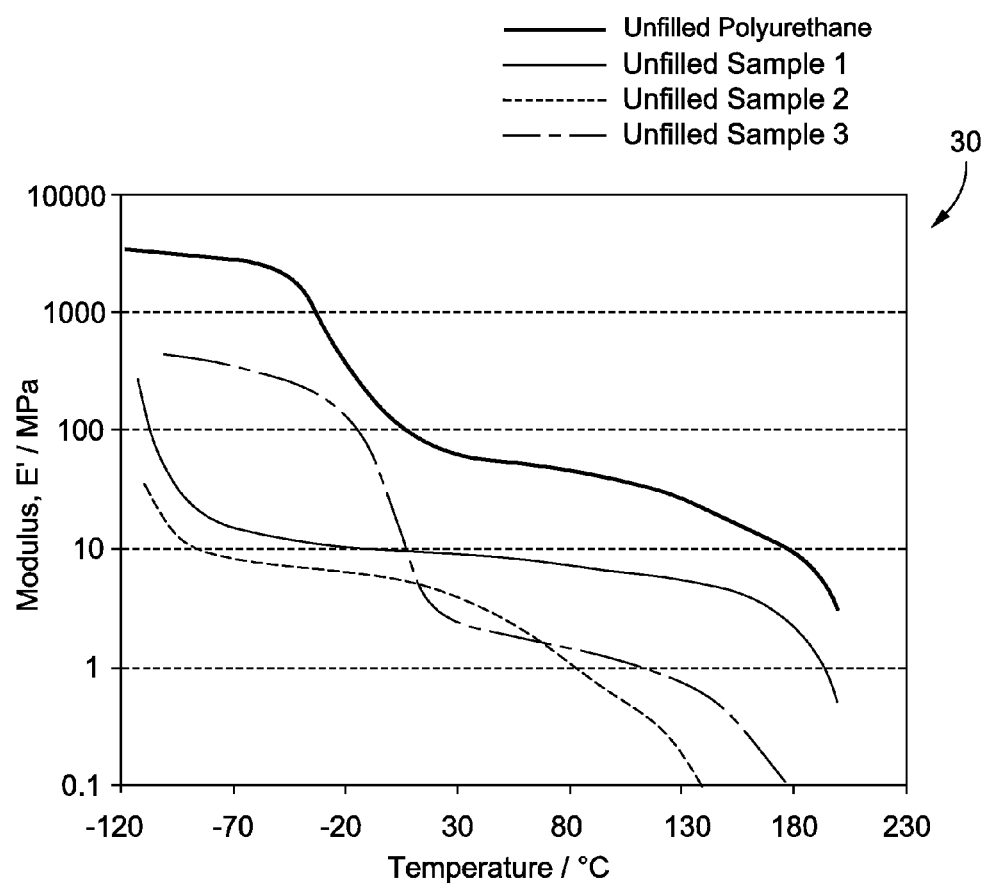
FIG. 5 is a graph showing the modulus behavior with respect to temperature of unfilled composite material compositions of FIG. 3.

FIG. 5 is a graph showing the modulus behavior with respect to temperature of unfilled composite material compositions of FIG. 3. The scan rate was equal to 3° C./minute. FIG. 5 shows that with unfilled PDMS 5k/HMDI/D400 Sample 2, the low temperature behavior showed no evidence of stiffening due to JEFFAMINE D400 components and kept a modulus below unfilled PDMS 5k/HMDI/DAC Sample 1 down to −110° C. The product of these changes, unfilled PDMS 5k/HMDI/ED600 Sample 3, possessed an increase in diisocyante to siloxane ratio of 6 to 1 versus 4 to 1 for unfilled PDMS 5k/HMDI/DAC Sample 2 and a higher molecular weight polyether chain extender of 600 Da (Dalton) versus 400 Da for unfilled PDMS 5k/HMDI/ED600 Sample 3 and unfilled PDMS 5k/HMDI/D400 Sample 2, respectively. The consequence of these modifications was to improve the high temperature softening point of unfilled PDMS 5k/HMDI/ED600 Sample 3 over unfilled PDMS 5k/HMDI/D400 Sample 2 by 40° C. for unfilled materials (see FIG. 5) and by 100° C. for filled materials (see FIG. 6). Increasing poly (propylene oxide) curative molecular weight from 400 to 600 and an increased percent composition due to higher isocyanate to siloxane ratio brought with it a noticeable glass transition in the unfilled material as well around 0° C. (see FIG. 5). For the 40 vol % solid particulate filler, for example, metal iron powder, filled material, this translated into a modulus that was roughly three (3) times higher for filled PDMS 5k/HMDI/ED600+2% CAB-O-SIL Sample 3 over filled PDMS 5k/HMDI/D400 Sample 2 over the entire temperature range between 0° C. to −110° C. The abrupt stiffening shown in the unfilled PDMS 5k/HMDI/ED600 Sample 3 had been modified to a steady increase with decreasing temperature and one that was ten (10) times lower than the corresponding filled Polyurethane with 40 vol % solid particulate filler, for example, metal iron powder.

Specifically, the molecular weight of the amine or hydroxy chain extender (curative) was increased in order to reduce the density of hydrogen bonding urea groups used to create intermolecular bonding between chains. A filled Polyurethane sample (see FIG. 6) clearly showed dramatic stiffening at −20° C. as it passed the glass transition temperature. The previously developed low temperature polyurea siloxane copolymer (Sample 1) was also presented with its low constant modulus (5-15 MPa) across a broad temperature range of −90° C. to 150° C. This specific formulation was produced from a siloxane ($\alpha,\omega$-(alpha, omega)-dihydroxy terminated PDMS, molecular weight approximately 5000 g/mole) and isocyanate prepolymer cured with a low molecular weight amine compound (1,2 diaminocyclohexane, FW 114). All samples in FIG. 3 showed elongational behavior dramatically decreased upon the addition of 40 vol % (83 wt %) of solid particulate filler, for example, metal iron powder. Their primary shortcoming was the poor temperature performance due to extreme stiffening as found in FIG. 5. This extreme elongational capacity in the base matrix together with the addition of 2% fumed silica produced a 40 vol % solid particulate filler, for example, metal iron powder, filled composite that showed well over 200% elongation and a tensile strength of 11.2 MPa. Solvent resistance was also dramatically improved (see FIG. 9) in filled PDMS 5k/HMDI/ED600+2% CAB-O-SIL Sample 3 over filled PDMS 5k/HMDI/D400 Sample 2 due to increased crosslinking density from higher isocyanate to siloxane ratio, particularly in lubricating oil and jet fuel categories.

Figure 6:
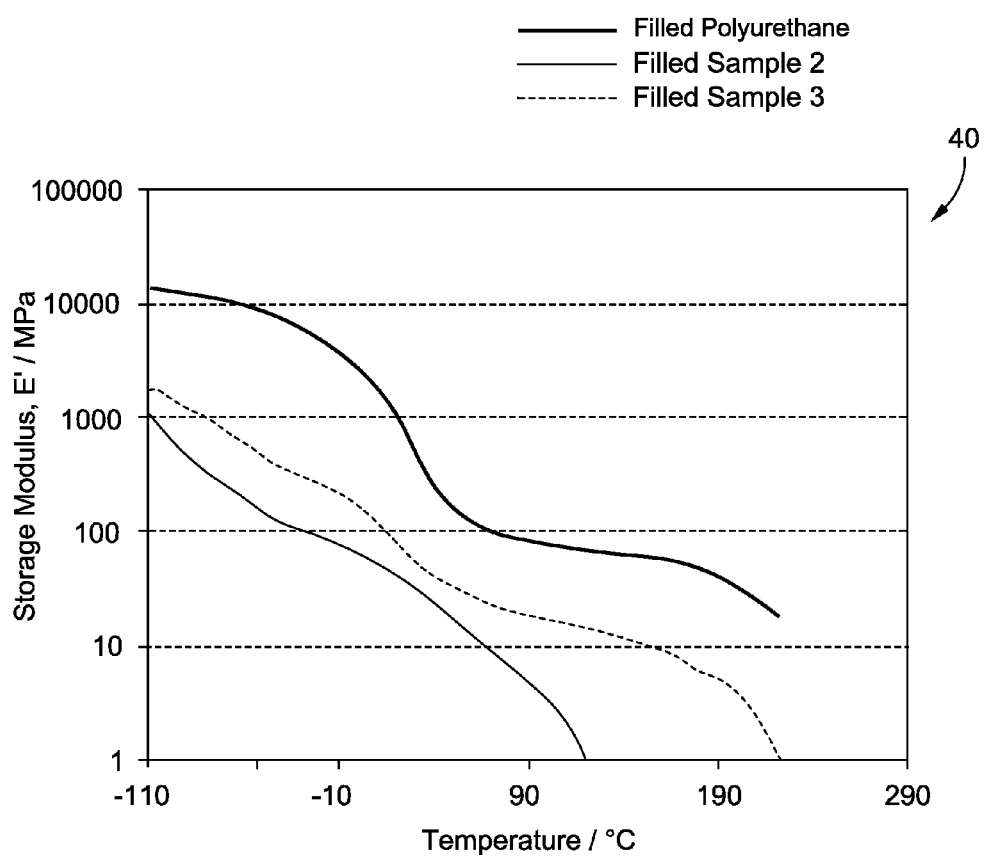
FIG. 6 is a graph showing the modulus behavior with respect to temperature of filled composite material compositions of FIG. 4.

FIG. 6 is a graph showing the modulus behavior with respect to temperature of filled composite material compositions of FIG. 4, that is, composite material compositions loaded with 40 vol % solid particulate filler, for example, metal iron powder.

Figure 7:
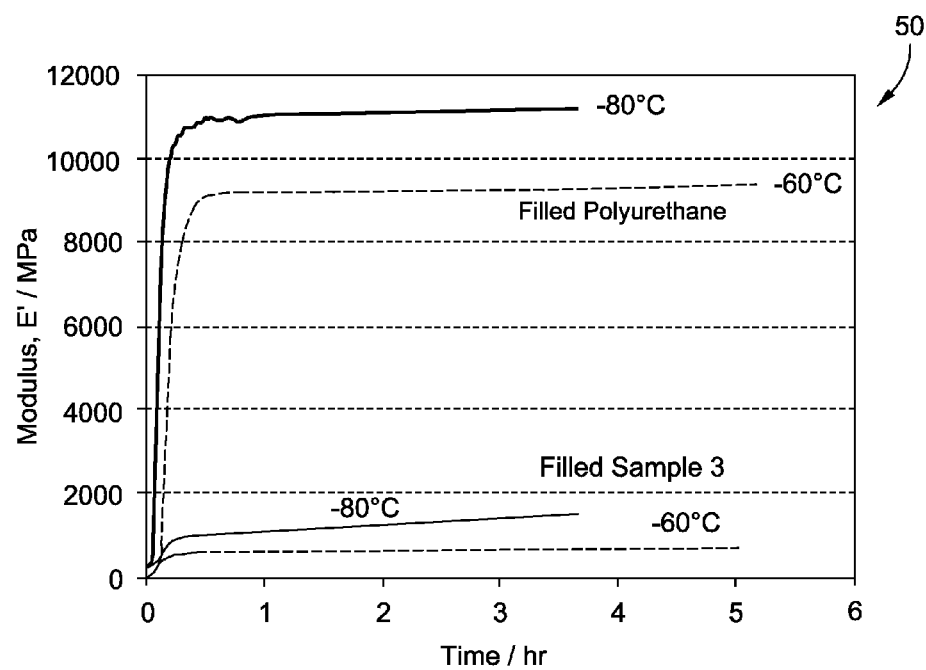
FIG. 7 is a graph showing the modulus behavior with respect to time of filled Polyurethane and composite material composition of filled Sample 3 of FIG. 4.

FIG. 7 is a graph showing the modulus behavior with respect to time of filled Polyurethane and composite material composition filled PDMS 5k/HMDI/ED600+2% CAB-O-SIL Sample 3 of FIG. 4. FIG. 7 also shows the dynamic mechanical analysis showing modulus versus time of 40 vol % solid particulate filler, for example, metal iron powder, filled Polyurethane and composite material composition filled PDMS 5k/HMDI/ED600+2% CAB-O-SIL Sample 3 exposed to extended low temperatures. In order to simulate extended high altitude environments, both filled Polyurethane and filled PDMS 5k/HMDI/ED600+2% CAB-O-SIL Sample 3 were exposed to fixed low temperatures for multiple hours. FIG. 7 shows modulus as a function of time for both filled Polyurethane and filled PDMS 5k/HMDI/ED600+2% CAB-O-SIL Sample 3 starting out at ambient and quickly ramping to either −60° C. or −80° C. for 5 hours and 3.5 hours, respectively. The order of magnitude difference in modulus of filled Polyurethane compared to filled PDMS 5k/HMDI/ED600+2% CAB-O-SIL Sample 3 was evident. Moduli for all Samples quickly plateaued to a fixed value with the exception of filled PDMS 5k/HMDI/ED600+2% CAB-O-SIL Sample 3 at −80° C. which saw steady increase from 1000 MPa to 1400 MPa over the 3.5 hours exposure time. When filled with 40 vol % solid particulate filler, for example, metal iron powder, and sprayed onto a surface, the composite material compositions showed a steady monotonic rise in modulus (see FIG. 7) due to the addition of solid particulate fillers. Such an increase in modulus at low temperatures was likely unavoidable with such high levels of filled material, and the best low temperature performance possible could be achieved through minimization of any stiffening contribution due to the surrounding elastomeric matrix.

FIG. 8 is a table showing soak temperature, soak duration, and final modulus of filled Polyurethane and filled composite material composition PDMS 5k/HMDI/ED600+2% CAB-O-SIL Sample 3 shown in FIG. 7. Filled PDMS 5k/HMDI/ED600+2% CAB-O-SIL Sample 3 was soaked for five (5) hours at a soak temperature of −60° C. and had a final modulus of 601 MPa. Filled PDMS 5k/HMDI/ED600+2% CAB-O-SIL Sample 3 was soaked for 3.5 hours at a soak temperature of −80° C. and had a final modulus of 1430 MPa. Filled Polyurethane was soaked for five (5) hours at a soak temperature of −60° C. and had a final modulus of 9300 MPa. Filled Polyurethane was soaked for 3.5 hours at a soak temperature of −80° C. and had a final modulus of 11100 MPa.

Embodiments of the disclosed composite material compositions and coatings accommodate high levels of functional solid particulate fillers while remaining much more flexibility at low temperatures compared to existing polyurethane and silicone materials. In order to achieve this, modification of PDMS 5k/HMDI/DAC Sample 1, as discussed above, was undertaken to reduce material modulus through a decrease in the molar ratio of isocyanate to siloxane and incorporation of higher molecular weight curatives. A decreased isocyanate to siloxane ratio softened the material due to a decreased number of physically associating urea groups. PDMS 5k/HMDI/DAC Sample 1 possessed an isocyanate to siloxane ratio of 5 to 1 whereas PDMS 5k/HMDI/D400 Sample 2 decreased to a ratio of 4 to 1. In addition oligomeric α,ω-(alpha, omega)-diamino linear polyetheramine compounds of poly(propylene oxide) and poly(propylene oxide)/poly(ethylene oxide) (JEFFAMINE D400, JEFFAMINE ED600) were exchanged for the lower molecular weight curatives in PDMS 5k/HMDI/DAC Sample 1. This created a base material with a modulus that decreased from 9.3 MPa to 4.5 MPa at 25° C.

Incorporation of poly(propylene oxide) oligomers as curatives brought with it the potential stiffening influence due to the inherent Tg (glass transition temperature) of the poly(propylene oxide) or propylene oxide species. However, the degree to which a classic glass transition was observed in the overall material will depend on the % composition containing poly(propylene oxide) or propylene oxide and the length of the individual poly(propylene oxide) or propylene oxide curative molecules with greater composition and greater curative molecular weights contributing to greater bulk poly(propylene oxide) or propylene oxide thermal behavior. The use of polyether segments as curatives helps to reduce the extreme contrast in chemical dissimilarity between hard and soft segments and toughen the material.

CONCLUSION

Thus, it has been unexpectedly discovered that the combination of segmented copolymer elastomers (an α,ω-(alpha, omega)-dihydroxy terminated polysiloxane species, a diisocyanate species, and an amine or hydroxy terminated chain extender) incorporating high loading levels (such as greater than or equal to 40 vol %) of solid particulate filler materials maintained flexibility at a temperature of down to about −100 degrees Celsius, exhibited a percent elongation of greater than about 100%, and exhibited a tensile strength of greater than about 5 MPa (megapascals). Embodiments of the disclosed composite material compositions and coatings dramatically outperformed existing filled polyurethane systems by producing moduli ten (10) times lower for equivalent filler down to temperatures of −100° C.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A flexible, low temperature, filled composite material composition comprising:
   a segmented copolymer elastomer prepared with:
   an α,ω-(alpha, omega)-dihydroxy terminated polysiloxane species;
   a diisocyanate species; and,
   an amine or hydroxy terminated chain extender, wherein the amine or hydroxy terminated chain extender is a linear α,ω-(alpha, omega) amino or hydroxy end terminated oligomeric species having an average molecular weight of 400 grams per mole to about 5000 grams per mole; and,
   a solid particulate filler,
   wherein the composite material composition has a percent elongation of greater than about 100%, and has a tensile strength of greater than about 5 MPa (megapascals).

2. The composite material composition of claim 1, wherein the α,ω-(alpha, omega)-dihydroxy terminated polysiloxane species is selected from a group consisting of poly(dimethylsiloxane) (PDMS), poly(diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-poropylsiloxane), poly(methylethylsiloxane), poly(methylhydridosiloxane), and polydiethylsiloxane.

3. The composite material composition of claim 1, wherein the α,ω-(alpha, omega)-dihydroxy terminated polysiloxane species is poly(dimethylsiloxane) (PDMS).

4. The composite material composition of claim 1, wherein the α,ω-(alpha, omega)-dihydroxy terminated polysiloxane species is present in an amount of from about 30% by weight to about 80% by weight, based on a total weight percent of the composite material composition.

5. The composite material composition of claim 1, wherein the diisocyanate species is selected from a group consisting of 4,4'-methylenebis(cyclohexyl isocyanate) (HMDI), cycloalkyl based diisocyanates, tolylene-2,4-diisocyante (TDI), 4,4'-methylenebis(phenyl isocyanate) (MDI), and isophorone diisocyanate (IDI).

6. The composite material composition of claim 1, wherein the diisocyanate species is 4,4'-methylenebis(cyclohexyl isocyanate) (HMDI).

7. The composite material composition of claim 1, wherein the diisocyanate species is present in an amount of from about 5% by weight to about 40% by weight, based on a total weight percent of the composite material composition.

8. The composite material composition of claim 1, wherein the linear α,ω-(alpha, omega) amino or hydroxy end terminated oligomeric species is selected from a group consisting of an oligomeric diol or amine polyether, a linear polyether, poly(ethylene oxide), poly(propylene oxide), a copolymer of poly(ethylene oxide) and poly(propylene oxide), a linear polycarbonate, and a mixture of two or more thereof.

9. The composite material composition of claim 8, wherein the amine or hydroxy terminated chain extender is poly(propylene oxide) or a copolymer of poly(ethylene oxide) and poly(propylene oxide).

10. The composite material composition of claim 1, wherein the amine or hydroxy terminated chain extender is present in an amount of from about 10% by weight to about 50% by weight, based on a total weight percent of the composite material composition.

11. The composite material composition of claim 1, wherein a combination of the diisocyanate species and the amine or hydroxy terminated chain extender comprises one or more hard segments, and further wherein the one or more hard segments is present in an amount of from about 5% by weight to about 60% by weight, based on a total weight percent of the composite material composition.

12. The composite material composition of claim 1, wherein the solid particulate filler is selected from a group consisting of a pulverized or powdered metal, a pulverized or powdered salt, a pulverized or powdered inorganic oxide, a pulverized or powdered carbon, a pulverized or powdered ceramic, and a mixture of two or more thereof.

13. The composite material composition of claim 1, wherein the solid particulate filler is present in an amount of 5 volume percent (vol %) to about 70 volume percent (vol %), based on a total volume percent (vol %) of the composite material composition.

14. A flexible, low temperature, filled composite coating comprising:
   a composite material composition comprising a segmented copolymer elastomer and a solid particulate filler, the segmented copolymer elastomer prepared with:
      an α,ω-(alpha, omega)-dihydroxy terminated polysiloxane species;
      a diisocyanate species; and,
      an amine or hydroxy terminated chain extender, wherein the amine or hydroxy terminated chain extender is a linear α,ω-(alpha, omega) amino or hydroxy end terminated oligomeric species having an average molecular weight of 400 grams per mole to about 5000 grams per mole,
   wherein the coating has a percent elongation of greater than about 100%, and has a tensile strength of greater than about 5 MPa (megapascals).

15. The coating of claim 14, wherein the α,ω-(alpha, omega)-dihydroxy terminated polysiloxane species is selected from a group consisting of poly(dimethylsiloxane) (PDMS), poly(diphenyl-co-dimethylsiloxane), poly(methyl-3,3,3-trifluoropropylsiloxane), poly(methyl-n-octylsiloxane), poly(di-n-pentylsiloxane), poly(methyl-n-hexylsiloxane), poly(di-n-propylsiloxane), poly(methyl-n-pentylsiloxane), poly(methyl-n-butylsiloxane), poly(di-n-butylsiloxane), poly(methyl-n-poropylsiloxane), poly(methylethylsiloxane), poly(methylhydridosiloxane), and polydiethylsiloxane.

16. The coating of claim 14, wherein the diisocyanate species is selected from a group consisting of 4,4'-methylenebis(cyclohexyl isocyanate) (HMDI), cycloalkyl based diisocyanates, tolylene-2,4-diisocyante (TDI), 4,4'-methylenebis(phenyl isocyanate) (MDI), and isophorone diisocyanate (IDI).

17. The coating of claim 14, wherein the amine or hydroxy terminated chain extender is a linear α,ω-(alpha, omega) amino or hydroxy end terminated oligomeric species selected from a group consisting of an oligomeric diol or amine polyether, a linear polyether, poly(ethylene oxide), poly(propylene oxide), a copolymer of poly(ethylene oxide) and poly(propylene oxide), a linear polycarbonate, and a mixture of two or more thereof.

18. The coating of claim 14, wherein the solid particulate filler is selected from a group consisting of a pulverized or powder metal, a pulverized or powdered salt, a pulverized or powdered inorganic oxide, a pulverized or powdered carbon, a pulverized or powdered ceramic, and a mixture of two or more thereof.

19. A method of synthesizing a flexible, low temperature, filled composite material composition prepared by:
   mixing an α,ω-(alpha, omega)-dihydroxy terminated polysiloxane species, a diisocyanate species, and an amine or hydroxy terminated chain extender to form a segmented copolymer elastomer, wherein the amine or hydroxy terminated chain extender is a linear α,ω-(alpha, omega) amino or hydroxy end terminated oligomeric species having an average molecular weight of 400 grams per mole to about 5000 grams per mole; and,
   mixing the segmented copolymer elastomer with a solid particulate filler to form a composite material composition having a percent elongation of greater than about 100%, and having a tensile strength of greater than about 5 MPa (megapascals.

20. The method of claim 19, wherein the mixing the segmented copolymer elastomer with the solid particulate filler comprises mixing the solid particulate filler in an amount of 5 volume percent (vol %) to about 70 volume percent (vol %), based on a total volume percent (vol %) of the mixture of the segmented copolymer elastomer and the solid particulate filler.

21. The method of claim 19, wherein the mixing the segmented copolymer elastomer with the solid particulate filler further comprises adding fumed silica as a reinforcing filler.

22. The method of claim 19, further comprising formulating the composite material composition into a solution for application via a spray coating method to a surface to be exposed to extended, subfreezing temperatures.

* * * * *